Feb. 4, 1969 B. WARMAN 3,426,155

SUBSCRIBER'S LINE CIRCUIT USING REED RELAYS

Filed June 29, 1965

United States Patent Office 3,426,155

Patented Feb. 4, 1969

3,426,155

SUBSCRIBER'S LINE CIRCUIT USING REED RELAYS

Bloomfield Warman, Charlton, London, England, assignor to Associated Electrical Industries Limited, London, England, a company of Great Britain Filed June 29, 1965, Ser. No. 467,934

Claims priority, application Great Britain, July 2, 1964, 27,368/64

U.S. Cl. 179—18 9 Claims

Int. Cl. H04m 3/00

ABSTRACT OF THE DISCLOSURE

A subscriber's line circuit in an electronic telephone exchange provides for distinguishing between a normal calling condition and a so-called "permanent" calling condition in which the line wires are looped but no impulse trains received within a reasonable time. The circuit utilises sealed-reed relays.

Figure 1:
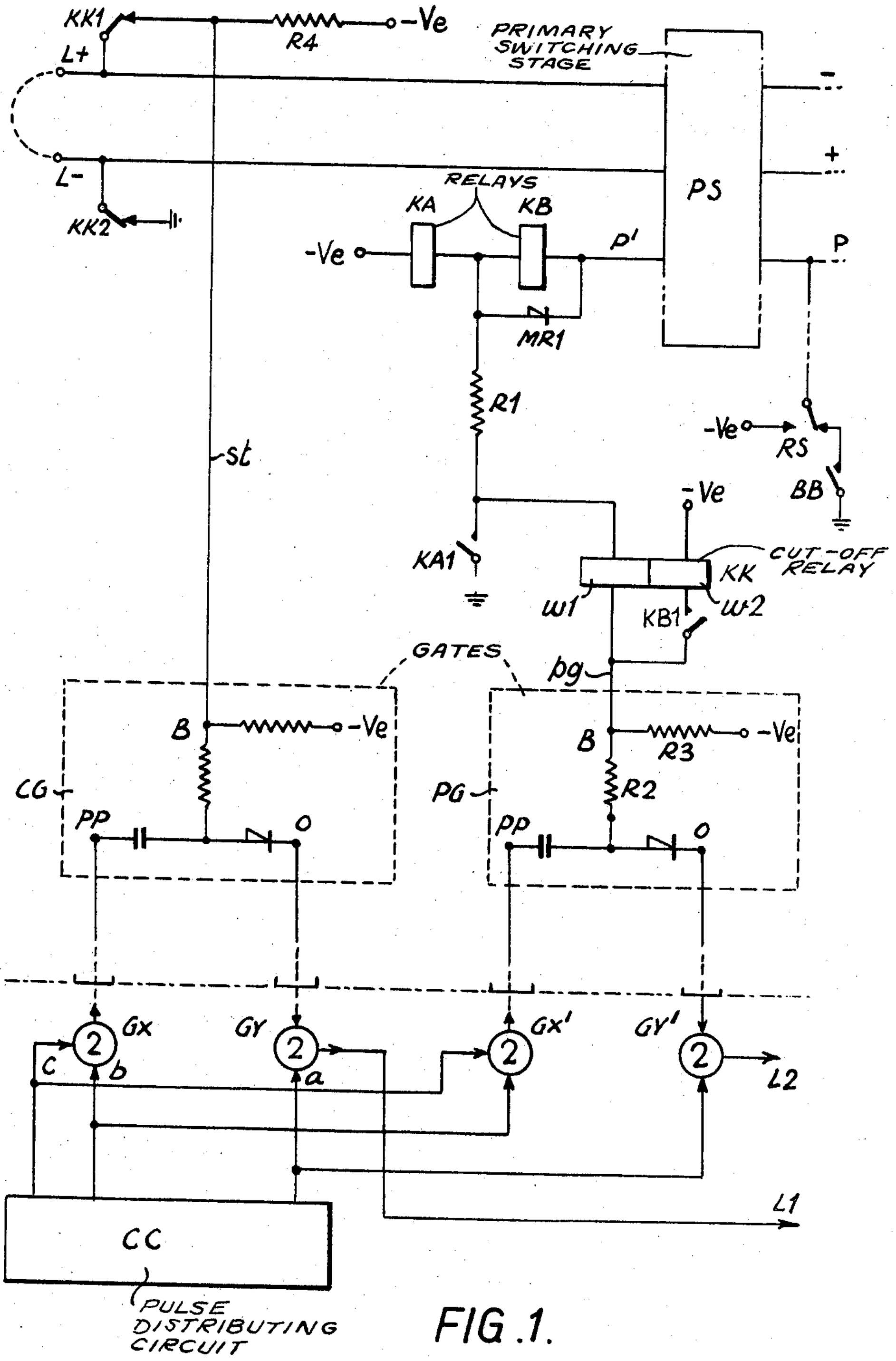

This invention relates to automatic telecommunication, especially telephone systems and is particularly concerned with the line circuits for such systems.

In automatic telephone exchange systems, lines incoming to an exchange from subscribers' stations are normally connected to switches of a primary switching stage through which the lines have access to other exchange apparatus serving to establish connection towards a called line. Each line has its own line circuit which is sensitive to different line conditions and can therefore serve to indicate the line condition obtaining at any time, namely whether the line is free, calling or engaged. The invention relates to such systems in which the calling condition of a line (usually brought about by looping of the line wires at the subscriber's station) results in its line circuit producing a starting potential as a consequence of which a setting action is initiated by which a primary stage switch becomes set so as to connect the line, possibly through set switches of one or more subsequent switching stages, to other exchange apparatus which has been seized for dealing with the expected call. In the kind of system to which this invention relates each line circuit includes a cut-off relay which is operated to disconnect the starting potential after the setting of a primary stage switch has been accomplished.

Provision is commonly made in telephone exchange systems for detecting the existence of a so-called permanent-calling or permanent-loop condition of a line and for rendering this permanent calling condition ineffectual. (A permanent-loop condition may arise in the following circumstances; namely: when a calling condition has appeared on a line but has not been followed within a reasonable time by the impulse trains which should be received over the line to identify the destination of the call; when at the end of a call the calling subscriber fails to replace his telephone handset; when at the end of a call the called subscriber does not replace his handset and does not subsequently dial within a reasonable period.) In general, where such provision is made the detection of a permanent calling condition on a line is followed by the release, either manually in response to an appropriate alarm or automatically, of equipment which had unnecessarily been seized as a result of this condition.

In commonly assigned copending application No. 212,-508, now U.S. Patent 3,231,681 there is described and claimed a form of line circuit which includes resistances over which a calling condition on the line builds up a starting potential for initiating the setting of a primary switch and which also includes a two-step cut-off relay having a fully operated condition in which all its contacts are operated, a fully released condition in which all its contacts are released, and a partially operated or released condition in which only some of its contacts are operated. This cut-off relay is so connected that on the one hand it can be fully operated in response to an operating condition extended thereto over the set primary switch, being effective when fully operated to disconnect the resistances from the line and to prepare for itself a local holding circuit independent of the primary switch; and that on the other hand it can be either fully released by a releasing condition extended to it over the primary switch in place of the operating condition, or partially released by removal of the operating condition without replacement by the releasing condition. In its partially released condition the relay reconnects the resistances to the line, completes for itself the prepared local holding circuit, which maintains the relay in this partially released condition, and causes the production of a second potential, additional to the starting potential, to indicate that only partial release of the cut-off relay has occurred.

With this form of line circuit, therefore, the two step cut-off relay becomes fully operated during the initial stages of the setting up of a call (namely after the primary switch has been set) remains fully operated during the call, and is normally fully released at the end of the call by substitution of the releasing condition for the operating condition, the releasing condition conveniently being a short-circuit. However in a permanent-calling condition of the line, consequent automatic or manual release of the seized exchange apparatus is arranged to result in removal of the operating condition without replacement by the releasing condition. Consequently the cut-off relay is then only partially released and the second potential already referred to is produced, indicating that a permanent-calling condition of the line has occurred. If the permanent-calling persists the starting potential will also again be produced by the line circuit by reason of the reconnection of the resistances to the line in the partially released condition of the cut-off relay.

The line circuit thus produces the starting potenial alone for a normal calling condition, said second potential alone for a permanent-calling condition which had occurred but which is no longer present, and both of these potentials together for a permanent-calling condition which still persists, whether it has not been cleared or has been cleared but revived by a subsequently occurring calling condition. The second potential, when present conjointly with the starting potential can accordingly be utilised to inhibit the normal effect of the latter so that while the line remains in the permanent calling condition this calling condition is rendered ineffectual to instigate the actions which normally result from it. On the other hand when the second potential is present alone this can be detected and utilised to initiate an action resulting in full release of the line cut-off relay and consequently restoration of the line to normal service: this can be effected for instance by setting a primary switch to the line and extending through this switch to the line cut-off relay the releasing condition required for its full release.

The present invention provides a form of line circuit which, while serving the same functions as that of U.S. Patent 3,231,681, eliminates the need for a special (two-step) type of relay and permits relays of a simple, for example sealed-reed, type to be used.

Figure 2:
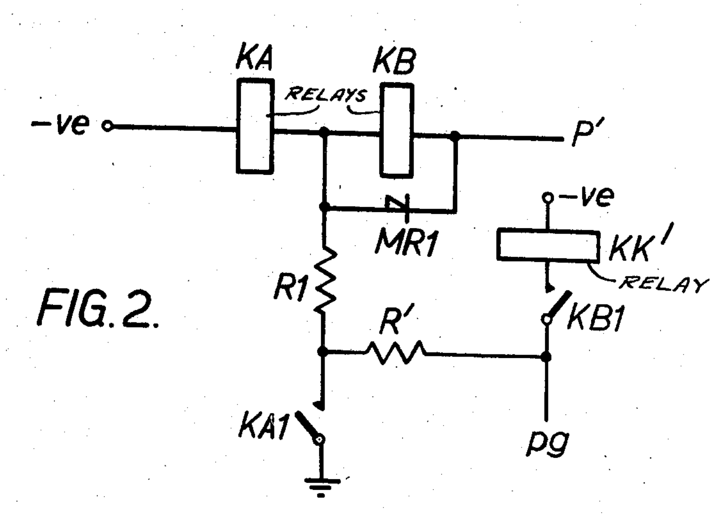
Figure 3:
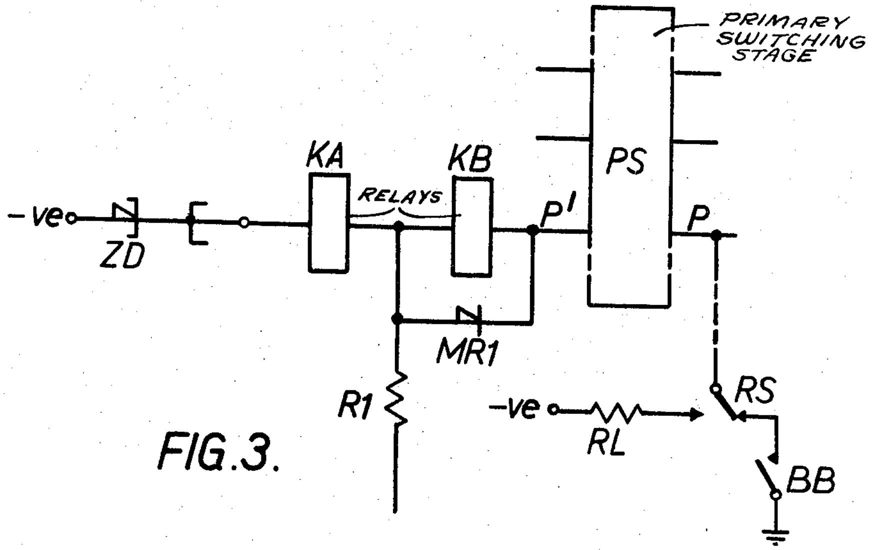

The nature of the invention may best be gleaned from the embodiment thereof illustrated by the accompanying drawings, in which:

FIG. 1 is a diagram of a line circuit in accordance with the invention and shows schematically an associated scanning arrangement and other associated apparatus; and FIGS. 2 and 3 show modifications which may be embodied in the apparatus shown in FIG. 1.

In FIG. 1, L+ and L— represent the speech wires of a telephone subscriber's line. In the quiescent (free) condition of the line one of these wires (L+) is connected to a source of negative potential (—*ve*) through a resistor R4 and a first break contact KK1 of a cut-off relay KK. The other wire (L—) is connected to earth through a second break contact KK2 of the relay KK. In the quiescent condition a lead *st* connected between contact KK1 and resistor R4 is maintained virtually at the —*ve* potential, but on initiation of a call by looping of the line wires L+ and L— the potential of this lead is changed towards earth by reason of the connection now established via contact KK2, the line loop and contact KK1.

The lead *st* is connected to the bias input B of a pulse-plus-bias gate CG the pulse input PP of which is connected to the output of a scanning gate GX the inputs *c* and *b* of which are fed with scanning pulses from a pulse distributing circuit CC. The output O of gate CG is connected to one input of another scanning gate GY the other input *a* of which is also fed with scanning pulses from the circuit CC. In conjunction with the gates GX and GY the pulses produced by the circuit CC interrogate in turn the gate CG and the corresponding gates similarly individually associated with the other line circuits. The circuit CC may be assumed to be constituted and to function in conjunction with the gates GX and GY (and likewise GX' and GY') in the manner described in U.S. Patent 3,231,681 with reference to FIG. 2 thereof. For the present purposes it is sufficient to state that interrogation of the gate CG, taking it as typical, is effected by the coincidental application of scanning pulses to the inputs *c*, *b* and *a* to the gates GX and GY. With lead *st* at —*ve* potential (line not calling) the gate CG is biased closed and interrogation of the gate has no result. However with the potential of lead *st* changed towards earth (line calling) the gate CG is biased open so that when it is interrogated the pulse fed to its pulse input PP from gate GX passes through it and through the gate GY to a marking lead L1 thereby marking this lead to indicate the calling condition of the line.

In the absence of a marking pulse on lead L2, which will be considered later, the marking pulse on lead L1 initiates in a manner such as described in U. S. Patent 3,231,681 again with reference to FIG. 2 thereof, an action which temporarily stops the scanning action and identifies the calling line to equipment which in known manner causes a switch in the primary switching stage (represented by the rectangle PS) to set to the calling line thus identified. Also in known manner the setting of a primary switch to the calling line is followed by the extension over the switch to the line's private or test wire P' of a busying earth potential applied to the test wire P associated with the set switch. For this purpose, and purely by way of schematic example, the drawing shows connected to the test wire P a contact BB which can be operated (closed) at an appropriate time so as to apply busying earth potential over a change-over contact RS. This latter contact is operated at the end of the call to apply a releasing —*ve* potential to the test wire in substitution for the busying earth potential. In the case of a line in a permanent calling condition, however, the subsequent manual or automatic release of equipment taken into use in response to this condition to deal with an expected call which failed to materialize, will be accompanied by release of contact BB (without operation of contact RS) so that the test wire P then has no potential connected to it.

Returning to the line circuit, this further includes two relays KA and KB connected in series between the line's test wire P' and a source of —*ve* potential. The junction of these two relays is connected through a resistor R1 and a make contact KA1 of relay KA to earth. Relay KB, connected between relay KA and the test wire P', is shunted by a rectifier MR1 poled to conduct towards the latter in its forward (low impedance) direction of conduction. The cut-off relay KK has two windings, *w*1 and *w*2, connected in series with each other, with a make contact KB1 of relay KB between them, between —*ve* and the junction between resistor R1 and contact KA1. From the junction between winding *w*1 and contact KB1 a lead *pg* extends to the bias input B of a pulse-plus-bias gate PG, which is of the same form as gate CG. The pulse input PP of this gate PG is connected to the output of a scanning gate GX' and the output O of the gate is connected to one input of a scanning gate GY'. These scanning gates GX' and GY' are connected to the pulse distributing circuit CC in the same manner as the corresponding gates GX and GY associated with gate CG: consequently the gates CG and PG are interrogated together, in turn with the corresponding pairs of pulse-plus-bias gates similarly associated with the other lines.

Separate gates GX and GX' have been shown in the drawing in order to line up with FIG. 2 of U.S. Patent 3,231,681 in which separate gates were necessary because the interrogation gates CG and PG required signals of different polarity to operate them. In the present case, however, the gates CG and PG are identical: consequently the scanning gates GX and GX' could be replaced by a single gate feeding the pulse inputs PP of gates CG and PG in common.

On a normal call the busying earth potential, extended to the test wire P' of the line circuit as already explained, brings about the operation of relays KA and KB. Contact KA1 closes a local circuit for relay KA over resistance R1 whose value is such as to prevent short-circuiting of relay KB, the rectifier MR1 being backed off at this time.

With contacts KA1 and KB1 both operated a circuit is also closed between earth and —*ve* through the two windings of relay KK in series. Relay KK therefore operates, opening its break contacts KK1 and KK2 to disconnect the earth potential and resistor R4 from the line wires L+ and L—. The pulse-plus-bias gate PG is held closed in the quiescent condition by the —*ve* potential applied to its bias input B over a relatively high value resistor R3, which is so dimensioned relatively to the resistance values of the gate input resistor R2 and the windings of relay KK that when contacts KA1 and KB1 are both operated the potential at the bias input B is still at a level to maintain the PG gate in the closed condition.

As previously described, the line circuit is released by the substitution of a negative battery potential for the earth potential originally applied to the P wire, this being effected by operation of contact RS. In this condition the rectifier MR1 is biased in its forward conducting condition and clamps the junction of the relays KA and KB virtually to the —*ve* potential so that both relays release. Contacts KA1 and KB1, restoring, release relay KK.

In the event of a permanent calling condition on the line L+, L—, subsequent release of seized equipment is accompanied by removal of the earth potential on the P wire, which is left disconnected: this can be effected by opening contact BB. In this condition relay KB releases but relay KA remains held operated over its local holding circuit through contact KA1. With contact KB1 open and KA1 closed, a circuit extends over the winding *w*1 of relay KK and high resistance R3 to —*ve*. In this circuit the current flow is too small to maintain relay KK operated and this relay restores to reclose its contacts KK1 and KK2 to re-connect the earth potential and resistor R4 to the line wires L+ and L—. Also the potential at junction of resistors R2 and R3, that is, at the bias input B of gate PG, rises towards earth potential and thereby biases this gate open. Consequently when the gate PG is interrogated, the pulse applied at its pulse input PP passes through it and through gate GY' to lead L2.

If the permanent calling condition of the line still persists at the instant of interrogation, the gate CG will also be biased open by the calling potential on lead *st*: consequently leads L1 and L2 both receive marking pulses which in the manner described in U.S. Patent 3,231,681 cross-inhibit each other so that no resultant action takes place. When, however, the permanent calling condition has been cleared, the next interrogation will result in only lead L2 being marked with a pulse, gate CG being now closed by the negative potential present on lead *st* via resistor R4 (line loop now absent). Again in the manner described in U.S. Patent 3,231,681 this marking of lead L2 alone results in a primary switch being set to the line concerned and in negative potential being applied to the P wire (contact RS operated) so as to release relay KA and thereby restore the line circuit to normal.

It is envisaged that the relays KA, KB and KK will be reed relays and that they may be mounted, along with the corresponding relays in the line circuits of other lines, in modular units such as form the subject of copending application Ser. No. 359,345, now U.S. Patent 3,302,068 for example. For this purpose relays KA and KB can be provided as simple, single coil, single contact unit reed relays of identical design arranged, together with the resistors R1 and R4 and the rectifier MR1, as a single modular unit. The relay KK can be provided as a two-winding, two-contact unit reed relay with permanent magnet polarisation of its contact unit. (This polarisation will maintain the contacts normally closed and will be overcome by energisation of the windings to allow the contacts to open, thereby achieving the required break contact action.) The modular construction of this relay can be similar to that described in said copending application Ser. No. 359,345 (now U.S. Patent 3,302,068) for a four contact unit relay except that two of the contact units, diametrically opposed, would be replaced by permanent magnet rods. The gate circuit components, namely for gates CG and PG, can also be modularly mounted, the complete line circuit being therefore provided in three modular units.

It has been found that a sufficiently sensitive cut-off relay of the magnetic reed type can be designed with only one winding. The relevant part of the circuit of FIG. 1 modified to include such a relay KK′, is shown in FIG. 2. Here, the single relay winding takes the place of winding *w*2 (FIG. 1) and the other winding *w*1 is replaced by a resistor R′ of similar value. This relay KK′ still has two reed contact units with permanent magnet polarisation, providing the break contacts, KK1 and KK2.

Another modification to the system shown in FIG. 1 is illustrated in FIG. 3. Such a modification can be used in systems where a follow-on call may occur and cause an earth connection to be applied to the test wire P while that wire is connected to the negative potential by a changeover contact RS during the process of releasing the line circuit. A resistor RL is connected between the negative source and the changeover contact RS, its resistance being chosen to limit to an acceptable value the current flowing in what would otherwise be a short-circuit. A Zener diode ZD is included in the connection from the negative source to relay KA to provide a volt drop (of, say, 2–3 volts) which will balance the volt drop across rectifier MR1 under normal release conditions; this will reduce to an acceptable value the voltage across relay KA and enable that relay to release properly in spite of the volt drop across resistor RL, thus enabling the value of this resistor to be sufficiently high for current-limiting without adversely affecting the release of relay KA in the absence of a follow-on call. In the event of a follow-on call the presence of resistor RL will enable the earthing of the test wire P to hold the line circuit (as is required).

What I claim is:

1. An automatic telecommunication switching system including a primary switch stage, a plurality of line circuits for respective lines connected to the primary switch stage, resistances in each of said line circuits connected to present a starting potential in response to a calling condition of the pertinent line, and means responsive to such starting potential for initiating setting of a primary switch to which calling line is connected, each of said line circuits comprising a cut-off relay having contacts connected for disconnecting said resistances from the pertinent line when operated and first and second further relays having respective contact means for establishing an operating circuit for the cut-off relay when both said further relays are operated and for causing release of the cut-off relay when both are released, said further relays being connected for joint operation in response to an operating condition extended thereto over a primary switch set as aforesaid and for joint release in response to a releasing condition similarly extended thereto in replacement for said operating conditions, said contact means of the first further relay being connected for also establishing for that relay, a local holding circuit independent of the primary switch stage and effective, on removal of said operating condition without replacement by said releasing condition consequent upon a permanent-calling condition of the line, to maintain that relay operated while permitting release of the second further relay, the contact means of this latter relay being connected for then causing release of the cut-off relay and the production of a potential indicative of the permanent-calling condition.

2. An automatic telecommunication switching system as claimed in claim 1, wherein said relays are of the magnetic reed type.

3. An automatic telecommunication switching system as claimed in claim 1, wherein each said line circuit includes a pair of coincidence gates connected respectively to receive as priming signals said starting and permanent-calling potentials as produced by the line circuit, and wherein said means responsive to the starting potential is a scanning circuit arrangement which is common to all the line circuits and has connections thereto for applying concurrently to both coincidence gates of each of the several line circuits in turn an interrogating signal, any primed gate being responsive to such interrogating signal to produce an output signal signifying a detected line, the scanning circuit arrangement also including means responsive to an output signal from either gate of a pair, but not from both gates, to produce marking signals which identify the line thus detected, and also to provide marking signals indicative of which gate of the pair produced the output signal.

4. An automatic telecommunication switching system as claimed in claim 1, including a holding potential terminal and a further terminal for the application of a potential cooperable with said operating condition for energizing both said further relays in series, wherein the second further relay has an operating winding of which one end has a connection to the primary switch stage, over which connection said operating condition is extended to the further relays, the first further relay has an operating winding connected between said further terminal and the other end of the operating winding of the second further relay, and the local holding circuit for the first relay comprises a contact of that relay and a resistance connected in series between said holding potential terminal and the junction between said windings of the further relays.

5. An automatic telecommunication switching system as claimed in claim 4, including a rectifier connected in parallel with said winding of the second further relay and poled in a sense to be reverse biased by the operating condition but forward-biased by the releasing condition.

6. An automatic telecommunication switching system as claimed in claim 5, including a source of potential for providing said releasing condition, switch means for connecting the source to the primary switch stage on the opposite side thereof relatively to the further relays, and a current-limiting resistance connected in series between the source and said switch means.

7. An automatic telecommunication switching system as claimed in claim 6, wherein the potential of said source approximates to the potential applied for cooperation with said operating condition, and the system includes a voltage-dropping element connected to the terminal for the application of the last-mentioned potential, this potential being applied to the terminal through said element, said element providing under said releasing condition a volt drop approximating to the volt drop in said rectifier connected in parallel with the winding of the second further relay.

8. An automatic telecommunication switching system as claimed in claim 1, wherein the cut-off relay has two operating windings both of which must be energized for operation of its contacts said operating windings being connected in series with the contact means of the two further relays, the contact means of the second further relay being connected between the two windings and one of the windings being connected between the contact means of the respective further relays, a connecting lead on which said permanent-calling condition will be produced being connected to the junction between the last-mentioned operating winding and the contact means between the two relays.

9. An automatic telecommunication switching system as claimed in claim 1, wherein said cut-off relay has a single operating winding, and the line circuit includes a resistance connected between and in series with the contact means of the further relays for establishing said operating circuit, the contact means of the second further relay being connected to the winding, and a connecting lead on which said potential indicative of the permanent-calling condition will be produced is connected to the junction of this resistance with the contact means of the second further relay.

References Cited

UNITED STATES PATENTS

| | | | |
|---|---|---|---|
| 3,025,356 | 3/1962 | Muroga et al. | 179—18 |
| 3,161,732 | 12/1964 | Martin et al. | 179—27 |

WILLIAM C. COOPER, *Primary Examiner.*